Dec. 24, 1957  J. H. ROWEN ET AL  2,817,813
MEASUREMENT OF THE COMPLEX TENSOR PERMEABILITY
AND THE COMPLEX DIELECTRIC
CONSTANT OF FERRITES
Filed July 20, 1954  2 Sheets-Sheet 1

INVENTORS: J. H. ROWEN
W. H. VON AULOCK
BY H. O. Wright
ATTORNEY

Dec. 24, 1957
J. H. ROWEN ET AL
2,817,813
MEASUREMENT OF THE COMPLEX TENSOR PERMEABILITY
AND THE COMPLEX DIELECTRIC
CONSTANT OF FERRITES
Filed July 20, 1954
2 Sheets-Sheet 2
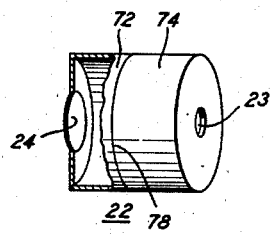
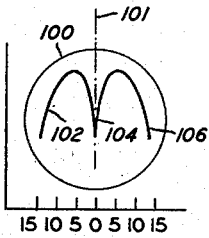
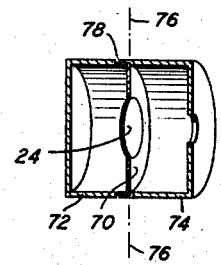
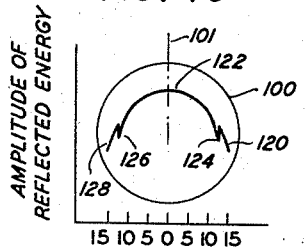
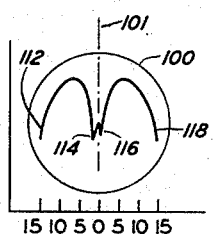
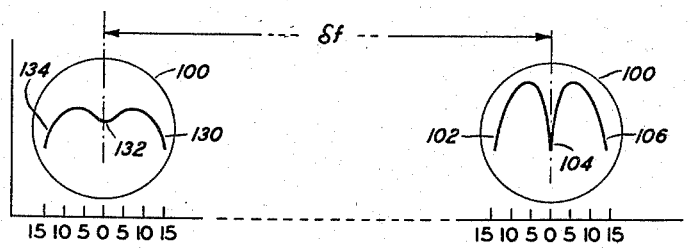
DIELECTRIC CONSTANT MEASUREMENT
INVENTORS: J. H. ROWEN
W. H. VON AULOCK
BY H. O. Wright
ATTORNEY de# United States Patent Office 2,817,813
Patented Dec. 24, 1957

2,817,813

MEASUREMENT OF THE COMPLEX TENSOR PERMEABILITY AND THE COMPLEX DIELECTRIC CONSTANT OF FERRITES

John H. Rowen and Wilhelm H. von Aulock, Morristown, N. J., assignors to Bell Telephone Laboratories, Incorporated, New York, N. Y., a corporation of New York Application July 20, 1954, Serial No. 444,436

12 Claims. (Cl. 324—58.5)

This invention relates to an improved means and method for measuring the complex tensor permeability and the complex dielectric constant of ferrites at microwave frequencies. More particularly, it relates to an improved means and method of the perturbation type for measuring the aforesaid characteristics of ferrites.

A principal object of the invention is to improve the accuracy with which measurements relating to the determination of the microwave frequency complex tensor permeability of ferrites can be made.

A further principal object is to make possible the measurement of the microwave frequency complex tensor permeability of ferrites for degrees of magnetic polarization remote from that at which the phenomena of ferromagnetic resonance occurs.

Still another principal object of the invention is to facilitate the mathematical interpretation of data obtained by the perturbation method relating to the determination of the microwave frequency complex tensor permeability of ferrites.

A further object is to facilitate the measurement of the complex dielectric constant of ferrites.

A still further object is to facilitate the measurement of the microwave frequency complex tensor permeability of ferrites for degrees of magnetic polarization near that at which ferromagnetic resonance occurs.

Other and further objects will become apparent during the course of the description hereinunder of the features of the invention and a system for making measurements in accordance with the principles of the invention, as well as from the appended claims.

In general, the perturbation method, as applied to the determination of the characteristics of ferrites, comprises inserting a small sample of the ferrite material, the characteristics of which are to be measured, in a perfectly symmetrical or degenerate cavity whose microwave resonant frequency and "Q" characteristics, in the absence of any perturbing element, have been accurately determined. By carefully measuring changes in the relevant cavity characteristics, i. e., the change in the resonant frequency and the change in "Q" of the cavity, which result from the introduction of the test sample for each of various degrees of unidirectional static magnetization of the sample, the complex tensor permeability of the sample at microwave frequencies can then be determined. Because of the non-reciprocal characteristics of a ferrite sample when polarized by a static magnetizing field and the fact that a symmetrically-coupled, perfectly degenerate, cavity will respond to a linearly polarized input wave by giving rise to two orthogonally related wave components or to two circular wave components of opposite directions of rotation, the insertion of the ferrite sample in the perfectly degenerate cavity will result in the case of the permeability tests, in a splitting of the single resonance of the cavity alone into two resonances, one at a higher and one at a lower frequency than that of the cavity alone.

The test sample should have such dimensions and geometrical contour relative to the internal contour of the cavity, and be so positioned within the cavity that the field within the sample can be stated simply in terms of the field in the unperturbed cavity. For testing the microwave frequency magnetic properties (i. e., the complex tensor permeability) of a ferrite sample it is convenient and desirable to position the sample at a point in the cavity where the microwave frequency electric field is zero and hence can be ignored. Preferably the perturbing effects of the sample should not substantially change the essential characteristics of the field within the cavity. These considerations require that the volume of the sample be very small relative to that enclosed by the cavity; that the geometrical contour of the sample be correlated appropriately to that of the space enclosed by the cavity; and that the position of the sample within the cavity be suitably chosen.

Opposed to the requirement of a sample of very small volume is the necessity of having a sample of sufficient volume that its perturbing effects will be of sufficient magnitude to be readily measured with a high degree of accuracy. This is particularly important where the value of the unidirectional magnetic polarization of the sample is not close to that value at which the phenomena known as ferromagnetic resonance in the material of the sample occurs. In general the term "off-resonance" will be employed to denote that values appreciably removed from the ferromagnetic resonance value are under consideration.

Since, in connection with ferrites, the characteristics of prime importance are frequently those determined by the non-reciprocal nature of the material at off-resonance values of polarization, it is necessary that a perfectly degenerate or perfectly symmetrical cavity (including means for coupling to the cavity in a perfectly symmetrical manner to introduce dominant mode [$TE_{111}$] waves as the testing energy) be employed, so that, for example, either a pair of orthogonally related dominant mode linearly polarized waves, or a pair of circularly polarized waves of opposite directions of rotation, will encounter identical responses from the unperturbed cavity.

A type of cavity conforming with the above requirement is one enclosing a preferably circular cylindrical space, and having a small circular coupling iris centrally positioned in one end thereof, the other end being completely closed. The internal diameter of the cavity should be less than .766 time the wavelength in air, or free space, of the highest testing microwave frequency to be used and greater than .586 time the wavelength in air, or free space, of the lowest testing microwave frequency to be used. Since a cavity of substantially the maximum obtainable "Q" (i. e., ratio of reactance to resistance) is preferable, the internal length of the cavity should be substantially equal to the internal diameter of the cavity. For example, in the illustrative measuring circuit to be described in detail hereinafter, employing a testing frequency swept through a range of 30 megacycles centered about a median frequency of 9200 megacycles, a cavity having an internal diameter of 1.05 inches and a length of .91 inch was found to give very satisfactory results. Alternatively a perfectly symmetrical cavity of square cross section could be employed for testing ferrites in accordance with the principles of the present invention in which case a very thin square sheet of material should be used as the ferrite sample. Obviously, other completely symmetrically shaped cross sections such as octagonal, etc., could be employed and samples of ferrite having a corresponding contour should be employed with each such cavity. In general the length of the cavity is preferably made one half wavelength of the median testing frequency to be used. However, it is obvious that a cavity any desired integral number of half wavelengths long could be employed so long as the sample is placed at a node of the electric wave.

To realize the requirement that the dimensions and geometrical contour of the test sample should be such that the field within the sample can be stated simply in terms of the field in the unperturbed cavity, it has heretofore been assumed that, in taking measurements to determine the complex tensor permeability of ferrites, the test sample must be of spherical shape and of very small diameter so that the field within the sample will be virtually constant and simply related to the field in the unperturbed cavity at the point at which the sample is positioned for testing in the cavity. For example, with a cavity substantially as described above, sample spheres having diameters of less than .02 inch have normally been employed in such tests. As noted above, with such minute quantities of the test material, perturbation effects of practically measurable magnitudes, except closely adjacent to the condition of ferromagnetic resonance in the sample, are not obtainable and the accuracy of such data as can be obtained at and near the condition of ferromagnetic resonance is relatively poor. With the arrangements of the present invention, however, it is possible to employ samples of sufficient volume that the microwave frequency complex tensor permeability and the complex dielectric constant of ferrites can be accurately measured at unidirectional static magnetic polarizations of the sample far removed from the condition of ferromagnetic resonance.

A further very real objection to the use of spherical test samples arises from the fact that the boundary condition, relating the internal field in the sample to the surrounding field, and the mathematical equations, relating the complex tensor components of the permeability to the frequency change and "Q" change of the cavity, are quadratic and do not lend themselves to facile separation of the "real" and "imaginary" portions of the components, or coefficients, of the complex tensor permeability.

Applicants have resolved the above-described difficulties by employing in a perfectly circular cylindrical cavity, as described above, a very thin circular, disc-shaped sample of ferrite which is centrally assembled, for permeability tests, against the closed end wall of the cavity.

The advantages of employing a very thin disc-shaped sample in a cylindrical cavity, in the above indicated way, may be enumerated as follows:

(1) When the very thin disc is centrally assembled against the closed end wall of the cylindrical cavity the only significant boundary condition is that the tangential magnetic field should be continuous. That this condition is satisfied for dominant mode ($TE_{111}$) waves is immediately obvious to anyone skilled in the art. Therefore the magnetic field within the very thin disc-shaped sample is equal to the magnetic field within the unperturbed cavity. The electric field, of course, has a node, i. e., it is zero, at the end wall of the cavity for the dominant mode waves ($TE_{111}$) employed in these tests and can therefore be ignored.

(2) An exact integration of the field within the disc-shaped sample over the radial and tangential dimensions of the disc ($r$ and $\theta$, respectively) can be readily obtained.

(3) As a result of (1) and (2) immediately above, a sample of relatively large volume (as compared with the volume of the spherical samples it has previously been considered necessary to use) can be employed without violating any assumptions relating to the perturbation introduced. Therefore effects of sufficient magnitude to be accurately measured, even at points remote from the point of ferromagnetic resonance, are readily obtained. For example, if desired, a very thin disc having a diameter equal to the internal diameter of the cavity can be employed, though certain mathematical relations become more readily solvable for a disc diameter slightly less than one half the internal diameter of the cavity. Satisfactory accuracy of measurement, for the majority of practical purposes, is still realized with the above-mentioned smaller sample size.

(4) As a result of the simpler boundary condition on the disc-shaped sample as described in (1) above, the relationship between the intrinsic tensor permeability components, or coefficients, and the frequency change and Q change of the cavity, resulting from insertion of the sample, is mathematically very simple and yields a direct measure of the "real" and "imaginary" parts of each of the tensor components, or coefficients, of permeability.

As is well known to those skilled in the art, the "permeability," at microwave frequencies, of a magnetically polarized ferrite is most conveniently represented mathematically as a tensor (see "Mathematical Physics," Cambridge University Press, 1946, by Jeffries and Jeffries, chapter 3, page 78, for elementary discussion) since it involves two coefficients, or components, usually designated $\mu$ and K, respectively, both components being complex, i. e., both having a "real" and an "imaginary" portion. In the mathematical analysis, $\mu'$ and K' are used to indicate the "real" portions, and $\mu''$ and K'' are used to indicate the "imaginary" portions, of the coefficients, or components, $\mu$ and K, respectively. The first component, $\mu$, is similar in nature to the characteristic of ordinary magnetic materials, such as iron, which is designated "permeability." The second component, K, is a cross-coupling factor required at microwave frequencies, where, referring the properties of a sample of the substance to three orthogonally related axes $x$, $y$ and $z$, with a static unidirectional magnetizing force applied along the $z$ axis and a microwave frequency magnetizing field applied along another axis, for example the $x$ axis, a component of microwave frequency magnetization will result along the third or $y$ axis. In general the unidirectional static magnetic polarization of the ferrite sample is considered as being applied along (or parallel to) the $z$ axis. In the above described combination of a circular cylindrical resonant cavity and thin disc sample mounted against one end thereof, the $z$ axis direction is considered as being parallel to the longitudinal axis of the cavity and suitable means for effecting the desired degrees of static magnetization are placed adjacent to the ends of the cavity.

Since, as above described, the "permeability" of a magnetically polarized ferrite involves four portions, i. e., the "real" and "imaginary" portions of each of the components $\mu$ and K, it is, as previously mentioned, most conveniently represented mathematically as a "tensor," the tensor equation having the form $$\vec{b} = T_{ij}\vec{h} = \begin{bmatrix} \mu & -jK & 0 \\ +jK & \mu & 0 \\ 0 & 0 & \mu_0 \end{bmatrix} \vec{h} \quad (1)$$

which is readily expanded into the system of equations $$b_x = \mu h_x - jKh_y \quad (2)$$
$$b_y = +jKh_x + \mu h_y \quad (3)$$
$$b_z = \mu_0 h_z \quad (4)$$

In Equations 1 through 4:

$b$ is flux density $h$ is the applied field $\mu$ and K are the complex components or coefficients of the tensor permeability $T_{ij}$ (at microwave frequencies) expressed in matrix form in Equation 1 subscripts $x$, $y$ and $z$ denote the particular axis along which the flux or field is directed ($h_x$ and $h_y$ are microwave frequency fields; $h_z$ is the unidirectional static polarizing field); the arrow "→" above $b$ and $h$ in Equation 1 denotes that these quantities are vectors $\mu_0$ is the permeability of the ferrite with respect to the unidirectional static magnetic polarizing field $h_z$.

Equations 2 through 4 express the fact that an applied microwave frequency field in the $x$ direction, ($h_x$), produces a flux density not only in the $x$ direction but also in the y direction, and vice versa, as described above. This cross-coupling results from the precession of the magnetization M which in turn is associated with materials such as ferrites in which the physical phenomenon known as ferromagnetic resonance occurs.

As a consequence of this phenomenon the components of the complex tensor permeability of a ferrite, i. e. the coefficients on $h_x$ and $h_y$, namely $\mu$ and K, are dependent upon the magnitude of the static field (unidirectional magnetic polarizing field) applied in the z direction ($h_z$).

A principal object of the present invention is to provide a method for accurately determining the microwave frequency tensor permeability components, or coefficients, $\mu$ and K as functions of the static field ($h_z$), and for determining the complex dielectric constant, of the ferrite sample being tested.

With the very thin disc ferrite sample centrally assembled against the inner surface of the closed end of the circular cylindrical cavity as above described, only transverse components of the microwave frequency magnetic field $\vec{h}$ within the cavity, namely $h_r$ (radial with respect to the disc sample) and $h\theta$ (tangential with respect to the disc sample) are involved. As discussed above, the microwave frequency field within the very thin disc sample, assembled as described, is equal to that in the unperturbed cavity, i. e.

$$h_\theta^i = h_\theta^o \text{ and } h_r^i = h_r^o$$

where the "$i$" denotes "in the sample" and the "$o$" denotes "in the unperturbed cavity." For the steady magnetizing fields $$h_z^i = h_z^o - 4\pi M$$

where M is the steady magnetization applied.

The parameter $\delta\omega$ which is $2\pi$ times the frequency shift in the resonant frequency of the cavity, caused by insertion of the sample in the cavity, is then related to the "real" parts of the coefficients $\mu$ and K, namely $\mu'$ and K', described above, in the following way:

$$\frac{2\delta\omega}{\omega} = \frac{4t}{\lambda_g^3}\lambda^2[(\mu'-1)R_1 \pm K'R_2] \quad (5)$$

where $\omega$ is $2\pi$ times the resonant frequency of the cavity alone, $\lambda$ and $\lambda_g$ are the wavelengths of the microwave frequency in free space and within the cavity, respectively, $R_1$ and $R_2$ are constants determined by the geometry of the cavity and the test sample (see Equations 6 and 7 below) and $t$ is the thickness of the ferrite disc, which should be not greater than two percent of the disc diameter and is preferably less as will be discussed more fully hereinafter. More specifically $R_1$ and $R_2$ are ratios of the integrals of the Bessel functions over the disc sample and over the cavity and are given by the equations $$R_1 = \frac{\left(\frac{r_o}{a}\right)^2\left[J_o^2\left(\frac{r_o}{a}u'\right) + J_1^2\left(\frac{r_o}{a}u'\right)\left(1 + \frac{2}{\left(\frac{r_o}{a}u'\right)}\right)\right]}{.2387} \quad (6)$$

$$R_2 = \frac{J_1^2\left(\frac{r_o}{a}u'\right)}{.4045} \quad (7)$$

where $r_o$ is the radius of the disc, $a$ is the radius of the cavity and $u'$ is the first zero of the Bessel function $J_1'$ and has a value of 1.841. The Bessel functions $J_0$, $J_1$ and $J_1'$ are, of course, given in any standard table of Bessel functions.

Correspondingly the imaginary" parts of $\mu$ and K, namely $\mu''$ and K", can be determined by the change in Q occasioned by inserting the sample of ferrite in the cavity and magnetizing it by each particular value of static unidirectional field parallel to its z axis. The relation is as follows:

$$\frac{1}{Q_1} - \frac{1}{Q_0} = \frac{4t}{\lambda_g^3}\lambda^2[\mu''R_1 \pm K''R_2] \quad (8)$$

where $Q_1$ is the Q of the cavity with sample inserted and magnetized by a particular value of static field, $Q_0$ is the Q of the cavity alone and the other quantities are as described above in connection with Equations 5 through 7.

The relation 5 renders it easy to treat $\delta\omega$ as complex and to determine the "imaginary" parts $\mu''$ and K" of the coefficients $\mu$ and K as well. Because of the much greater volume of ferrite material in the disc sample, as compared with that in the minute spherical samples deemed essential for use in prior measuring methods, it is possible to measure values of the "imaginary" parts, $\mu''$ and K", as small as 0.0004, where the "Q" of the cavity can be measured with an accuracy of at least two percent. Reference may be had to an article by E. D. Reed entitled, "A Sweep Frequency Method of Q Measurement for Single Ended Resonators," published in the Proceedings of the National Electronics Conference, volume 7, 1951, pages 162 through 172, for a method of determining the resonance characteristic and the "Q" of the resonant cavity to a high degree of accuracy.

Since the thickness of the ferrite sample, normally 10 mils or less (a sample thickness of about 10 mils has been found satisfactory for measurements at static magnetizations appreciably removed from that at which ferromagnetic resonance occurs) is the only dimension over which the field is assumed, in the perturbation calculation, to be constant, there is no loss of validity if the diameter of the thin disc sample is increased to the internal diameter of the cavity (allowing suitable clearance for convenient assembly).

The problem of obtaining sufficiently thin disc samples for measurements at and near the static magnetization at which the phenomenon of ferromagnetic resonance occurs, where a thickness of only .001 inch, for example, is required, lest the dissipation in the sample obscure the resonance effects, was satisfactorily solved by first cementing the ferrite disc on a very thin (3 mil) mica supporting disc and then lapping the ferrite disc to a thickness of approximately .001 inch. The presence of the very thin mica supporting disc, as determined by tests conducted with the mica supporting disc only, assembled in the cavity, produced negligible perturbation. The perturbation obtained with the ferrite sample and supporting mica disc, as described above can, accordingly, be assumed, for all practical purposes, to be caused solely by the ferrite sample.

*Complex dielectric constant*

By making provision, as will be described hereinunder, for mounting the same, or a substantially similar, disc-shaped sample of ferrite as is used in the permeability tests, as described above, at the position of maximum electric field in the cylindrical cavity, measurements for determining the complex dielectric constant of the sample are readily made. This position is substantially at the transverse plane through the cavity normal to the longitudinal axis of the cavity and midway between the ends of the cavity.

The principles and methods of practicing the invention will become apparent during the course of the following detailed description of an illustrative system and apparatus for making tests in accordance with said principles and from the accompanying drawings in which:

Fig. 2 shows a right circular cylindrical resonant cavity of the type employed in the system of Fig. 1, with a sample disc of ferrite mounted therein in position for testing the complex tensor permeability of the disc ferrite;

Fig. 3 shows details of the resonant cavity of Fig. 2 with provision for mounting the test sample of ferrite in position for testing the complex dielectric constant of the disc of ferrite;

Fig. 4A is a cathode ray oscilloscope trace of the type obtainable with the system of Fig. 1 when the resonant characteristic of a circular cylindrical resonant cavity alone are being observed;

Fig. 4B is a typical cathode ray oscilloscope trace as obtained in accordance with the teaching of the prior art, with a small spherical sample of ferrite assembled centrally against the closed end wall of the circular cylindrical resonant cavity;

Figure 1:
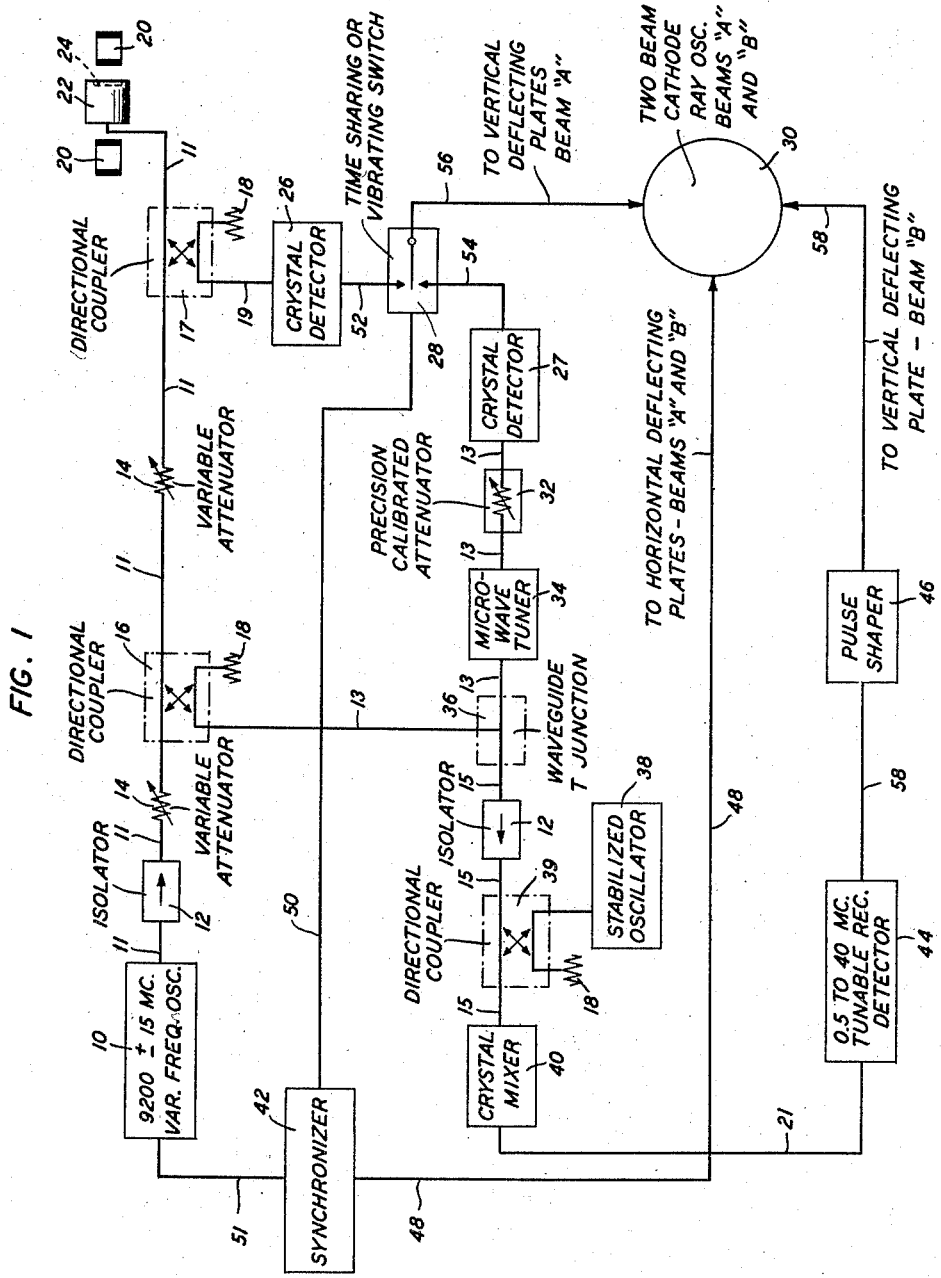
Fig. 1 shows one form of system for measuring the characteristics of ferrites, in accordance with the principles of the invention, at microwave frequencies.

Fig. 4C is a typical cathode ray oscilloscope trace as obtained with a disc-shaped sample of ferrite substituted, in accordance with the teaching of the present invention, for the small spherical sample employed to obtain the trace of Fig. 4B; and Fig. 5 shows a typical pair of cathode ray oscilloscope traces, one of which is obtained with a disc-shaped sample of ferrite mounted centrally at the middle of the resonant cavity, from which traces information sufficient for determining the "real" and "imaginary" portions of the complex dielectric constant of the ferrite being tested can be obtained.

In more detail in Fig. 1, oscillator 10 is a microwave frequency device, preferably of the so-called "klystron" type, having a median or nominal frequency, for example, in the order of 9200 megacycles, which oscillator is capable of being swept in frequency through a band of, for example, 30 megacycles substantially centered about the said median or nominal frequency.

The above-mentioned frequency sweep of oscillator 10 is controlled by synchronizer 42 which, by way of example, may furnish a sawtoothed shape voltage wave. As is well known to those skilled in the art such a wave applied to the repeller electrode of a klystron oscillator will cause the latter to sweep in frequency.

The output of oscillator 10 is conducted through a suitable section of rectangular wave guide 11 to isolator 12, which isolator permits substantially free transmission of the frequency swept wave from left to right but does not transmit the wave (or reflections thereof) in the opposite direction. This effectively isolates oscillator 10 from any reflected energy which may arise if impedance mismatching is encountered at any point to the right of isolator 12, and thus eliminates any tendency toward frequency pulling (or unwanted frequency variations) of the oscillator.

Several types of microwave isolators are well known to those skilled in the art, representative ones, for example, being those described in detail in the copending applications Serial No. 362,243 filed June 17, 1953 by A. G. Fox, Serial No. 362,193 filed June 17, 1953 by S. E. Miller and Serial No. 371,437 filed July 31, 1953 by S. E. Miller, all of said applications being assigned to applicant's assignee.

The output of isolator 12 is passed through attenuator 14 to directional coupler 16 where a portion of the energy is diverted to wave guide 13 and wave guide T-junction 36 and the circuits associated therewith which latter circuits will be described in detail presently.

A second portion of the energy continues directly through directional coupler 16 to a second variable attenuator 14 and a second directional coupler 17 which in turn divides the energy again, a portion being diverted to the terminating resistance 18 which is proportioned to match the impedance of the coupler terminal to which it is connected and thus to absorb energy directed to it. The remainder of the energy is passed to the right-circular, cylindrical, resonant cavity 22. Cavity 22 is illustrated in detail in Figs. 2 and 3 and will be described in detail hereinunder. A sample of ferrite 24, in the form of a thin disc, is centrally affixed to the closed or right end of cavity 22 for measuring the complex tensor permeability of the ferrite. As will become apparent in the description of Fig. 3, hereinunder, for measuring the complex dielectric constant of the ferrite sample, the disc will be mounted midway between the ends of the cavity 22 concentrically with and normal to the longitudinal axis, or center line, of the cavity 22. The magnetizing means 20 may comprise permanent magnets or electromagnets at the ends of cavity 22, arranged to suitably polarize the ferrite sample disc 24 to a wide range of degrees of static or unidirectional magnetization in a direction parallel to the longitudinal axis of the cavity.

It should be noted that the first directional coupler 16 is arranged so that a portion of any energy being propagated in wave guide 11 from left to right is, as previously mentioned, directed through wave guide 13 to the wave guide T-junction 36 and associated circuits while a portion of any energy in wave guide 11 being propagated in the opposite direction is directed by coupler 16 to the terminating resistance 18. Resistance 18 is proportioned to match the impedance of the coupler terminal to which it is connected and thus absorbs substantially all energy directed to it. Thus energy reflected back toward directional coupler 16 will be in part absorbed in resistance 18 and substantially none of it will be directed through wave guide 13 to T-junction 36 and its associated circuits.

Similarly for directional coupler 17, for any energy being propagated from left to right in wave guide 11 the portion diverted by the coupler will be absorbed by its associated terminating resistance 18, while for energy being propagated from right to left in wave guide 11 the portion diverted by directional coupler 17 will be directed through wave guide 19 to crystal detector 26 and its associated circuits.

Energy being propagated from right to left in wave guide 11 to the right of coupler 17 will comprise principally only the energy reflected from cavity 22 and the variations in the magnitude of this energy over the frequency range (9200 megacycles±15 megacycles, for example) through which the frequency of oscillator 10 is varied, are indicative of the electrical frequency characteristics of the resonant cavity 22 as modified by the presence in the cavity of the sample disc of ferrite 24 which is being tested.

The portion of this reflected energy from cavity 22 directed by coupler 17 through wave guide 19 to detector 26 is rectified by the detector and passed by conductive circuit 52 to the time sharing or vibrating switch 28 whence it is intermittently transmitted through conductive circuit 56 to the vertical deflecting plates of one beam "A" of the two-beam cathode ray oscilloscope 30.

Switch 28 is a two position switch and is alternately operated between the two positions by energy from synchronizer 42 in such manner that for alternate frequency sweeps of oscillator 10 it is one position and for the intermediate or other frequency sweeps of oscillator 10 it is in the other position.

In one position, as above described, it connects the output of detector 26 to the vertical deflecting plates of beam A of oscilloscope 30. In the other position it connects the vertical deflecting plates of beam A to the output of a second detector 27. Detector 27 rectifies energy derived from oscillator 10 through directional coupler 16, wave guide 13, wave guide T-junction 36, microwave tuner or wavemeter 34 and precision calibrated attenuator 32. Thus there appears on the vertical deflecting plates for alternate traces of beam A of oscilloscope 30, a sample of energy derived directly from oscillator 10 and a sample of energy reflected from cavity 22. The horizontal sweep of both beams A and B of oscilloscope 30 are synchronized with the frequency sweep of oscillator 10 by energy derived over conductive path 48 from synchronizer 42 so that both beams sweep horizontally across the screen of the oscilloscope for each frequency sweep of oscillator 10. The tuner 34 absorbs a small portion of the energy passing through it when the frequency of said energy coincides with the frequency to which tuner 34 is adjusted. This results in a short dip on the trace of energy from oscillator 10, indicating the point along the trace corresponding to the frequency absorbed. Precision calibrated attenuator 32 permits the insertion of known amounts of uniform loss throughout the swept frequency range, resulting in the production of parallel traces of the energy from oscillator 10 whose vertical separations can be employed to estimate the variations in strength of the trace corresponding to the energy reflected from cavity 22.

The remainder of the circuit, namely the branch connecting the left arm of wave guide T-junction 36 to the vertical deflecting plates of beam B of oscilloscope 30 comprises a frequency marking circuit consisting of an isolator 12, which can be the same as the isolator in the output of oscillator 10, a directional coupler 39 coupling stabilized oscillator 38 to wave guide 15 for the direction of propagation (for oscillator 38) to the left of coupler 39, a crystal mixer 40, a tunable receiver-detector 44 and a pulse shaper 46 connected as shown. Connections 15 are of wave guide and convey a portion of the energy from oscillator 10 reaching wave guide T-junction 36 to mixer 40, together with energy from oscillator 38, via coupler 39. Again, terminating resistor 18 matches the impedance of the terminal of coupler 39 to which it is connected and serves to absorb energy being propagated from right to left which is diverted by coupler 39 from the section of wave guide 15.

The frequency of oscillator 38 is set at substantially the median frequency of oscillator 10 for example, 9200 megacycles, so that when combined in mixer 40 with energy from oscillator 10, an intermediate frequency varying in frequency from 15 to 0 to 15 megacycles for each frequency sweep of oscillator 10, will result. Receiver-detector 44 can then be adjusted to give a pair of energy surges for each sweep of oscillator 10 substantially equally spaced in frequency from the median frequency and on each side thereof. For example, if receiver-detector 44 is set to 10 megacycles it will pass a surge of energy as oscillator 10 passes through each of the frequencies 9190 mc. and 9210 mc., the separation between surges representing 20 megacycles variation centered about the midfrequency 9200 mc. By tuning receiver-detector 44 to 5 megacycles, two surges displaced 5 megacycles each side of the median frequency will be obtained, et cetera. Pulse shaper 46 converts the above described surges of energy into sharp pulses so that two vertical lines appear on the oscilloscope screen equally spaced from the vertical center line thereof by an amount determined by the setting of receiver-detector 44. Should the frequency of oscillator 38 not be equal to the median frequency of oscillator 10 these marker lines will be displaced different distances from the vertical center line and the two oscillators can be re-aligned by retuning either until equal displacement is restored. Thus a very accurate check of the frequency at which resonant effects occur on the oscilloscope with respect to the midfrequency of the testing frequency range or with respect to each other can be made. A possible variation of the arrangement of the resonant cavity and associated circuits in the general testing circuit arrangement of Fig. 1 is as follows:

Cavity 22 can be replaced by a cavity of similar diameter but several half wavelengths long and provided with identical centrally located round coupling orifices in each end wall thereof. The test sample of ferrite is then mounted within the cavity at an electric node of the microwave frequency, intermediate the ends of the cavity, and the output is taken from the second orifice on the end opposite the input orifice. This output can then be directly connected to crystal detector 26 of Fig. 1 and directional coupler 17 can then preferably be replaced by an additional isolator 12 or it could be simply omitted. In general the arrangement of Fig. 1 as shown therein and described in detail above, is to be preferred, particularly in view of the necessity of magnetically polarizing the ferrite sample, which could not be as conveniently accomplished with the longer cavity required by the above described arrangement.

In Figs. 2 and 3 the details are shown of a suitable resonant cavity 22 to be employed in the system of Fig. 1 for the purposes of the present invention, where the test frequency is swept through a range of 30 megacycles centered about a median frequency of 9200 megacycles. In general the cavity employed should, by itself, be resonant at substantially the median frequency of the swept frequency range to be employed.

The cavity 22 comprises, for example, an assembly of brass precisely machined on its interior faces to provide a cavity 1.05 inches in diameter and .91 inch long, the internal end surfaces being plane and normal to the longitudinal axis of the cylinder and all surfaces being held to an accuracy of .0001 inch. A single, round, accurately centered, coupling orifice 23 having a diameter of substantially 0.2 inch is provided in one end wall, as shown, this end wall having a thickness of substantially .030 inch.

It is, of course, necessary to make suitable provision for opening the cavity in order to permit the insertion of ferrite samples for making the desired tests. In Figs. 2 and 3, a joint 78 is provided in the center of the cavity for this purpose. As shown in the cross-sectional view of Fig. 3, the two halves of the cavity 72 and 74 are given stepped edges accurately fitting each other.

For tests to determine the complex dielectric constant of the ferrite sample, it is, as described above, necessary to mount the test sample disc at the center of the cavity (the position of maximum electric microwave frequency field) in a plane normal to the longitudinal axis of the cavity. This is provided for, as shown in Fig. 3, by centrally mounting the sample disc 24 of ferrite on a disc of mica 70 having a thickness of substantially 3 mils and a diameter substantially equal to the stepped portion of the half 74, of cylindrical cavity 22 so that when inserted in said stepped portion and the other half 72 is added the mica disc will be accurately held at the position indicated in Fig. 3 for the duration of the appropriate tests. Before mounting the sample of ferrite on the mica disc, the mica disc alone is assembled in the cavity, as described above, and the cavity with the mica disc in place is measured to determine the perturbation caused by the mica disc alone. The ferrite sample is then mounted on the mica disc and the perturbation effects of the combination when assembled in the cavity are measured. Obviously, the difference between these tests results from adding the ferrite sample.

For tests to determine the complex tensor permeability of a ferrite, the disc 24 of ferrite may, of course, be simply placed against and centered with the inner surface of the solid end wall of the cavity, in half 72, as shown in the cut out portion of Fig. 2, a minute amount of a suitable adhesive being employed to hold the disc in position, as illustrated in Fig. 2, for the duration of the appropriate tests. As has previously been mentioned, a feasible way of making a test sample of ferrite of extreme thinness, for making measurements at and closely adjacent to the static magnetization at which ferromagnetic resonance occurs, is to affix a disc of ferrite of the desired diameter but of greater thickness than is ultimately desired to a disc of mica about 3 mils thick and then lap the ferrite disc to the desired thinness, .001 inch, for example, the mica disc serving to provide sufficient mechanical rigidity to support the ferrite sample during the measuring processes. Since other measurements more remote from the static magnetization corresponding to ferromagnetic resonance can satisfactorily be made with thicker ferrite disc samples, for example .010 inch thick, it is not necessary to employ a mica supporting disc for the ferrite sample when making such measurements.

In some instances it may be found preferable to provide one cavity of the type illustrated in Figs. 2 and 3 for making measurements to determine the complex dielectric constant of the ferrite sample and a second substantially identical cavity, except that it has no central joint and one end of the cavity can be removed for assembly of the ferrite sample centrally on the end wall opposite the end having the circular coupling orifice.

In Fig. 4A, circle 100 represents the screen of a cathode ray oscilloscope such as that of oscilloscope 30 of Fig. 1. A center line 101 is provided for convenient reference. A typical trace of the resonant characteristic, frequency versus amplitude of reflected power, of a perfectly symmetrical, or degenerate, circular cylindrical resonant cavity, such as cavity 22 of Fig. 1, is illustrated by the trace comprising the substantially identical lobes 102 and 106 with the resonance dip 104 centrally located between them. Assuming a 30 megacycle testing frequency sweep centered about a reference frequency of 9200 megacycles (designated by 0 [zero] in Fig. 4A), the sharp dip 104 indicates a sharp resonance of the cavity at 9200 megacycles and substantially no perturbation in the resonance of the cavity.

In Fig. 4B a typical trace showing the perturbation of the cavity resonance curve of Fig. 4A caused by introducing a small spherical ferrite sample of a ferrite to be tested, at the closed end of the cavity is shown. The side lobes 112 and 118 are substantially the same as the side lobes 102 and 106, respectively, of Fig. 4A but the central dip in Fig. 4B represents two resonances 114 and 116 slightly displaced on each side of the center line 101 of the screen 100. The depth of the dip including the resonances 114, 116 is appreciably less than that of dip 104 of Fig. 4A indicating that the Q of the cavity has been substantially decreased by dissipation in the ferrite sample.

As contrasted with the indication in Fig. 4B, in Fig. 4C a typical corresponding trace showing the perturbation of the cavity resonance curve of Fig. 4A caused by introducing a disc-shaped ferrite sample, instead of the spherical sample, at the closed end of the cavity, in accordance with the principles of the present invention, is shown. In Fig. 4C the two resonance dips 124, 126 are displaced by a far greater frequency interval from the center line 101 and are substantially equal in depth. A far more accurate measurement of the frequency displacement caused by insertion of the disc-shaped ferrite sample is therefore, obviously, obtainable from the trace of Fig. 4C than from the trace of Fig. 4B. Also the change in the "Q" of the cavity can be more accurately determined from the trace of Fig. 4C than from that of Fig. 4B. The traces of Figs. 4B and 4C are taken at substantially the same static magnetic polarizations and relatively near that required for the condition of ferromagnetic resonance. As previously mentioned, at off-resonance points the spherical sample would introduce virtually imperceptible perturbation effects while the disc sample would still produce effects from which accurate data for determining the components $\mu$ and K can be obtained. The "Q" of the cavity for the three tests, represented by the traces 4A, 4B and 4C, respectively, as described above, can be determined as demonstrated in the National Electronics Conference article by E. D. Reed, mentioned hereinabove. The second trace in each of the above described measurements for the oscillator output (obtained with the time-sharing switch in its lower position) is employed for calibration purposes only in substantially the manner described by Reed in the National Electronics article and has in each instance been omitted to avoid possible confusion.

Relation 5 given hereinabove, coordinates the "real" portions of the complex tensor permeability coefficients $\mu$ and K, namely $\mu'$ and $K'$, with the frequency shift $\delta\omega$.

By use of the frequency marker lines, provided by the circuit including stabilized oscillator 38, tunable receiver 44 and associated circuits of Fig. 1 described in detail above, the frequency shift $\delta\omega$ can, obviously, be obtained with a very high degree of accuracy from the trace of Fig. 4C, whereas with the trace of Fig. 4B the perturbation effect is so slight that only approximate estimates can be made even though the frequency marker lines were to be used.

In the determination of the "real" and "imaginary" parts, namely $\epsilon'$ and $\epsilon''$, of the complex dielectric constant $\epsilon$, the disc-shaped ferrite sample is mounted centrally within the cavity, midway between its ends, as described in detail above, and traces of the character shown in Fig. 5 are employed together with the following relations 9 and 10. To obtain the "real" part $\epsilon'$ of the dielectric constant $\epsilon$, for the ferrite sample being tested, the relation is $$\frac{2\delta\omega}{\omega} = \frac{4t}{\lambda_g}(\epsilon'-1)R_1 \quad (9)$$

where, as for relation 5, given hereinabove, $\delta\omega = 2\pi$ times the change in resonant frequency caused by insertion of the sample of ferrite in the cavity;
$\omega = 2\pi$ times the resonant frequency of the cavity alone;
$t$ = thickness of the ferrite disc;
$\lambda_g$ = wavelength of the microwave frequency within the cavity; and
$R_1$ = a geometrical constant (Equation 6).

Correspondingly, the "imaginary" part, $\epsilon''$, of the dielectric constant $\epsilon$ is obtained from the relation $$\frac{1}{Q_1} - \frac{1}{Q_0} = \frac{4t}{\lambda_g}\epsilon''R_1 \quad (10)$$

where $Q_1$ and $Q_0$ are as defined in connection with relation 8 given hereinabove.

As is obvious from the traces of Fig. 5, the change in resonant frequency of the cavity, caused by insertion of the sample of ferrite for the complex dielectric constant test, is very large (200 megacycles in a particular test, for example). This of course necessitates appropriate retuning of the median frequency of oscillator 10 of Fig. 1 in order to obtain the trace 130, 132, 134, representing the response of the cavity with the ferrite disc assembled centrally therein.

In Fig. 5 the trace representing the response of the cavity alone, comprising lobes 102 and 106 and dip 104 between them, is, of course, substantially the same as that shown in Fig. 4A and is as described in detail above in connection with Fig. 4A.

The trace representing the combination of the test ferrite disc assembled centrally at the median normal plane in the cavity is shown to the left of Fig. 5 and comprises lobes 130 and 134 with dip 132 between them. The amplitudes of both the lobes and the dip are substantially less than the corresponding portions of the trace for the cavity alone and are rounded off, as illustrated in Fig. 5. In view of the extremely large shift in the resonant frequency and the ease and accuracy with which "Q" measurements may be made, as described hereinabove, the method of the invention affords a very accurate means for determining the "real" and "imaginary" portions of the complex dielectric constant of a ferrite sample. Again the traces obtained of the oscillator output (time-sharing switch in lower position) are employed for calibration purposes only and have been omitted to avoid possible confusion.

Other and further arrangements and variations of the illustrative systems and methods described in detail above, within the spirit and scope of the present invention, can readily be devised by those skilled in the art.

What is claimed is:

1. A method of obtaining the components of the complex tensor permeability of ferrites at microwave frequencies which includes symmetrically coupling to and measuring the frequency versus amplitude response of a perfectly degenerate, or perfectly symmetrical, conductive resonant cavity at said microwave frequencies, forming a sample of ferrite having a geometrical contour conforming to that of said cavity, placing said sample of ferrite at a position of zero microwave frequency electrical field and continuous tangential microwave frequency magnetic field within said cavity, magnetizing said element in a direction normal to said microwave frequency magnetic field at said position by various magnitudes of a static unidirectional magnetic field, and measuring the frequency versus amplitude response of said cavity with the sample in said position for each magnitude of static unidirectional magnetic field whereby the components, or coefficients, of the complex tensor permeability of said ferrite sample can be determined from the changes in the frequency versus amplitude responses obtained for each of a wide range of magnitudes of unidirectional magnetic polarization of said sample.

2. Apparatus for use in measurements to determine the "real" and "imaginary" portions of the components of the complex tensor permeability of ferrites at microwave frequencies, wherein the perturbation effects of inserting a test piece in a perfectly degenerate, symmetrical test cavity are observed, said apparatus comprising a perfectly degenerate, symmetrical test cavity and a test piece, said test piece being shaped to conform in geometrical contour with said cavity and being adapted to be placed within said cavity at a position of zero microwave frequency electric field and continuous microwave frequency tangential magnetic field, the dimensions of said test piece being not greater than those of the region of zero electric field and continuous tangential magnetic field within said cavity.

3. Apparatus for use in complex tensor permeability measurements in which the perturbation of a perfectly degenerate, symmetrical circular cylindrical resonant cavity, caused by insertion of a test piece, is measured and the complex tensor permeability of the ferrite is deduced therefrom, said apparatus comprising a perfectly degenerate, symmetrical circular cylindrical resonant cavity and a test piece of ferrite, said test piece of ferrite comprising a thin disc of ferrite having a diameter not greater than the internal diameter of said cavity and a thickness not greater than two percent of the disc's diameter.

4. A test piece for use in complex tensor permeability measurements of ferrite, said test piece comprising a thin layer of mica and a sample of ferrite affixed thereto, said sample of ferrite having a thickness not exceeding .001 inch.

5. The method of measuring the microwave frequency characteristics of ferrites which includes the determination of the perturbation resulting from inserting a test sample of a ferrite in a perfectly symmetrical or degenerate cavity said cavity alone being resonant at a known microwave frequency and having a known Q, the steps which comprise shaping the general contour of the test sample to conform with the general contour of the interior of said cavity, proportioning the dimensions of said test sample to be comparable to the dimensions of a space within said cavity in which the microwave electric field is virtually zero and the microwave magnetic field is continuously tangential, and positioning said sample symmetrically within said space whereby perturbation effects of sufficient magnitudes to be accurately determinable can be obtained for a very wide range of degrees of static magnetization of said test sample normal to said microwave magnetic field.

6. A method for determining the "real" and "imaginary" portions of the components, or coefficients, of the complex tensor permeability of ferrites over a particular band of microwave frequencies said method including the steps of establishing within a conductively confined space a completely symmetrical, or degenerate, low-loss, microwave frequency electromagnetic wave field resonant at substantially the mid-frequency of said microwave frequency band, said field having a portion in which the microwave frequency electric field is substantially zero and the microwave frequency magnetic field is continuously tangential, shaping a sample of ferrite to conform in general contour with said portion of said field, inserting said sample of ferrite symmetrically within said portion of said field, statically magnetizing said sample to successively differing degrees of magnetization over a wide range of values of magnetization in a direction normal to said microwave frequency magnetic field and measuring the perturbation of said field at each of said static magnetizations of said sample whereby the real and imaginary portions of the components, or coefficients, of the complex tensor permeability can be determined for each said static magnetization.

7. The method of testing ferrites at microwave frequencies which includes the steps of forming a perfectly symmetrical, or degenerate, circular cylindrical conductive low-loss cavity resonant at substantially the mid-frequency of a range of microwave frequencies at which said ferrites are to be tested, symmetrically coupling to one end of said cavity, measuring the resonance characteristic of said cavity over said frequency range, forming a disc-shaped sample of a ferrite to be tested, said sample having a diameter comparable to that of said cavity and a thickness not exceeding two percent of its diameter, mounting said sample symmetrically against the end of said cavity opposite the end at which coupling is effected, successively magnetizing said sample to each of a wide range of different static magnetizations in a direction parallel to the longitudinal axis of said cavity, and measuring over said frequency range and at each of said static magnetizations, the change in resonant frequency of said cavity resulting from the insertion of said sample, whereby the "real" and "imaginary" portions of the components, or coefficients, of the complex tensor permeability of said ferrite sample can be calculated.

8. Apparatus for testing the complex tensor permeability of ferrites at microwave frequencies which includes a perfectly symmetrical or degenerate circular cylindrical cavity resonant at substantially the median frequency of a range of frequencies at which said ferrites are to be tested, means for symmetrically coupling to one end of said cavity, means for sweeping a microwave frequency over the range of testing frequencies coupled to said cavity by said coupling means, means responsive to reflected energy from said cavity for measuring said reflected energy over said range of microwave frequencies, means for forming a test sample of a ferrite to be tested in the form of a disc having a diameter less than the internal diameter of said resonant cavity but greater than 0.4 times said cavity diameter, the thickness of said disc being not greater than 0.02 times its diameter, means for centrally positioning said disc against the inside surface of the end of said cavity opposite said coupling means and means for statically magnetizing said test sample in a direction parallel to the longitudinal axis of said cavity, said last stated means being adjustable over a wide range of values of static magnetizations whereby the perturbation of the resonance characteristics of said resonator for each of a large number of values of static magnetization of said sample may be observed and the complex components or coefficients of the tensor permeability of said ferrite sample can be obtained.

9. Apparatus for testing the complex dielectric constant of ferrites at microwave frequencies which includes a perfectly symmetrical, or degenerate, circular cylindrical cavity resonant at substantially the median frequency of the range of frequencies at which said ferrites are to be used and means for mounting a thin disc of ferrite to be tested, centrally within said cavity in a plane midway between the ends of said cavity and perpendicular to the longitudinal axis of said cavity and means for measuring the perturbation effects in the resonance characteristics of said cavity resulting from insertion of said disc centrally in said cavity whereby the "real" and "imaginary" components of the dielectric constant of said disc of ferrite can be determined.

10. Apparatus for use in determining the complex dielectric constant of ferrites at microwave frequencies which includes a perfectly symmetrical, or degenerate, cavity resonant at substantially the median frequency of the range of frequencies at which said ferrites are to be used, said cavity being jointed at a transverse plane perpendicular to the longitudinal axis and midway between the ends of said cavity, said jointed portion being adapted to hold a thin mica sheet member substantially in said transverse plane and a thin sample of ferrite to be tested, centrally mounted on a thin mica sheet member said mica member being of suitable size and shape to be inserted in and held by said jointed portion of said cavity, the said ferrite sample being of similar contour to that of said cavity, the thickness of said ferrite sample not exceeding two percent of its maximum transverse dimension, whereby said ferrite sample can be held at a position of maximum microwave frequency electric field within said cavity for tests to determine the perturbation of the resonance characteristics of said cavity resulting from insertion of said sample and the complex dielectric constant of said ferrite can be obtained to a high degree of accuracy.

11. Apparatus for determining the components, or coefficients, of the complex tensor permeability and the complex dielectric constant of ferrites at microwave frequencies, which includes means for establishing a perfectly symmetrical, microwave frequency, electromagnetic field, resonant at substantially the median frequency of a range of microwave frequencies in which said ferrites are to be used, said field having a first region of substantially zero microwave frequency electric field and substantially tangential microwave frequency magnetic field and a second region, parallel to said first region, of maximum microwave frequency electric field, means for establishing a static unidirectional magnetizing field normal to said first and said second regions and adjustable over a wide range of field strengths, and a sample of ferrite to be tested, said sample conforming in contour with said first region its dimensions being less than the maximum dimensions of said region, a first means for supporting said ferrite sample centrally within said first region and a second means for supporting said ferrite sample centrally within said second region and means for determining the perturbation of said field resulting from insertion of said sample in each of said regions, whereby the components, or coefficients, of the complex tensor permeability and the complex dielectric constant of said ferrite sample can be determined for each of a wide range of static magnetizations with a high degree of accuracy.

12. Apparatus for use in determining the components or coefficients of the complex tensor permeability and the complex dielectric constant of ferrites at microwave frequencies, which includes a perfectly symmetrical, or degenerate, cavity resonant at substantially the median frequency of the range of frequencies to be used, said cavity having a longitudinal dimension of substantially an integral number of half wavelengths of said median frequency, said cavity having a maximum transverse dimension, normal to said longitudinal dimension, of substantially one half wavelength of said median frequency, means for symmetrically coupling electrically to one end of said cavity, the other end of said cavity being closed, and a sample of ferrite to be tested, said ferrite sample being of similar contour to that of said cavity, means for mounting said sample centrally on the inner surface of the closed end of said cavity, the maximum transverse dimension of said sample being between four-tenths and five-tenths of the maximum transverse dimension of said cavity, the thickness of said sample being substantially one percent of the maximum transverse dimension of said cavity and means for alternatively mounting said sample in a position normal to the lonigtudinal axis of said cavity at a point of maximum intensity of the electrical field within said cavity.

References Cited in the file of this patent

UNITED STATES PATENTS 2,452,529     Snoek  ---------------- Oct. 26, 1948
2,692,978     Galt  ------------------ Oct. 26, 1954

OTHER REFERENCES

Tele-Tech and Electronic Industries, November 1954, pages 64, 65, 66, 137, 138, 139 and 140, article by Hogan.